United States Patent [19]
Tsukamoto et al.

[11] Patent Number: 4,560,851
[45] Date of Patent: Dec. 24, 1985

[54] SINGLE-ENDED PUSH-PULL INDUCTION HEATING APPARATUS

[75] Inventors: Kazuyoshi Tsukamoto; Etsuo Sakoguchi, both of Osaka, Japan

[73] Assignee: Sanyo Electric Co., Ltd., Japan

[21] Appl. No.: 439,612

[22] Filed: Nov. 5, 1982

[30] Foreign Application Priority Data

| Nov. 5, 1981 | [JP] | Japan | 56-177910 |
| Nov. 5, 1981 | [JP] | Japan | 56-177911 |
| Nov. 12, 1981 | [JP] | Japan | 56-169186[U] |
| Mar. 25, 1982 | [JP] | Japan | 57-48285 |
| Mar. 30, 1982 | [JP] | Japan | 57-52734 |
| Mar. 30, 1982 | [JP] | Japan | 57-52735 |

[51] Int. Cl.$^4$ .......................... H05B 1/02; H05B 6/06; H05B 6/64
[52] U.S. Cl. ................................ 219/10.77; 363/97
[58] Field of Search ............... 219/10.77, 10.49 R, 219/10.71, 10.75; 363/17, 98, 132, 133, 134, 97

[56] References Cited

U.S. PATENT DOCUMENTS

| 4,085,300 | 4/1978 | MacKenzie et al. | 363/98 |
| 4,150,426 | 4/1979 | Jansson | 363/97 |
| 4,316,243 | 2/1982 | Archer | 363/132 |
| 4,342,076 | 7/1982 | Rosswurm et al. | 363/132 |

FOREIGN PATENT DOCUMENTS 51-65447 6/1976 Japan.

OTHER PUBLICATIONS

IEEE Standard Dictionary of Electrical and Electronics Terms, 1977, p. 646, (definition of single-ended push-pull amplifier circuit).

Primary Examiner—C. L. Albritton
Assistant Examiner—M. M. Lateef
Attorney, Agent, or Firm—Darby & Darby

[57] ABSTRACT

An induction heating apparatus comprises an SEPP inverter including two transistors (Q1, Q2) connected in series, one transistor (Q1) being connected to a high electric potential end of a direct current power source (DB1) and the other transistor (Q2) being connected to a low electric potential end. A series circuit of a induction heating coil (L1) and a resonance capacitor (C1) is connected in parallel with one transistor (Q1) and freewheel diodes (D1, D2) are connected in anti-parallel with two transistors (Q1, Q2), respectively. A controlling circuit (71) turns one transistor (Q1) on/off in a predetermined cycle and a controlling circuit (72) turns the other transistor (Q2) on in an arbitrary time period in an off interval of one transistor (Q1) so that an input current to the series circuit is controlled.

28 Claims, 22 Drawing Figures (A) BASE VOLTAGE OF Q1

(B) BASE VOLTAGE OF Q2

(C) CURRENT OF LOAD CIRCUIT 2

(A) BASE VOLTAGE OF Q1

(B) BASE VOLTAGE OF Q2

(C) CURRENT OF LOAD CIRCUIT 2

(A) OUTPUT VOLTAGE OF n7

(B) BASE CURRENT OF Q1

(C) OUTPUT OF MV (D) BASE CURRENT OF Q2

(C') OUTPUT OF MV (D') BASE CURRENT OF Q2

(A) BASE VOLTAGE OF Q1

(B) BASE VOLTAGE OF Q2

(C) CURRENT OF LOAD CIRCUIT 2

(A) COLLECTOR CURRENT OF Q2

(B) CURRENT OF D1

(A) BASE VOLTAGE (B) BASE CURRENT

VOLTAGE

TIME →

SINGLE-ENDED PUSH-PULL INDUCTION HEATING APPARATUS

BACKGROUND OF THE INVENTION

1. Field of the Invention

The present invention, in general, relates to an induction heating apparatus and, more particularly, relates to an induction heating apparatus using a single-ended push-pull (SEPP) inverter.

2. Description of the Prior Art

Conventionally, as a driver circuit for this kind of induction heating cooking apparatus, a circuit in which a series resonance circuit comprised of an induction heating coil and a resonance capacitor is employed so that a high frequency inverter is structured by connecting a switching element in series with the resonance capacitor, is known. In such a cooking apparatus with the above described structure, an oscillation frequency of the inverter changes depending on an on interval of the switching element and a resonance cycle of the above described series resonance circuit. An input to a load is adjusted based on the change of the frequency, particularly, by controlling the on interval of the switching element. In such a cooking apparatus of the frequency control system type, a problem of noise generation arises when the cooking apparatus is of a multi-unit structure. More particularly, if and when adjoining heating units are simultaneously operated, as a matter of course, an oscillation frequency of an inverter changes due to a difference of material of a pan to be heated or a difference of a set input. The above described noise is generated by mutual interference of the magnetic field from each heating unit and according to the frequency difference between both, and tends to become larger as the frequency difference becomes larger. Such noise generation causes a value of commodity to be lowered since it makes a user feel unpleasant.

Accordingly, if it is possible to control an input to a load, that is, an output, without changing an oscillation frequency of inverters, any audible noise caused by the frequency difference between each unit will not be generated even if an induciton heating apparatus comprises a plurality of heating portions or units. The present invention is achieved in consideration of this respect.

SUMMARY OF THE INVENTION

Accordingly, a principal object of the present invention is to provide an induction heating apparatus capable of controlling an input to a load without changing an oscillation frequency of an inverter.

An induction heating apparatus in accordance with the present invention comprises an inverter including a first switching element connected to a high electric potential side of a direct current power source and a second switching element connected in series with the first switching element and also connected to a low electric potential side. A load circuit including a series connection of an induction heating coil and a resonance capacitor is connected in parallel with the first switching element. The first switching element is turned on/off in a predetermined cycle and the second switching element is turned on during the off interval of the first switching element. An adjustment of an input to the load circuit is performed by controlling the on interval of the second switching element.

Since the oscillation frequency of the inverter depends on the on/off interval of the first switching element, the oscillation frequency of the inverter is always constant in accordance with the present invention and thus there is no fear that the noise due to the frequency difference is caused even if a plurality of heating units are provided adjacent with respect to each other, which makes a user perform a pleasant cooking operation. Furthermore, since a structure wherein a heating is automatically started from a lower input state at the time of starting an oscillation of the inverter, is possible, that is, a start by a so-called soft start is possible, it is possible to prevent generation of an excess current and an excess voltage which are easily generated at the time of a start and thus it is possible to reduce the load of the switching element.

In a preferred embodiment of the present invention, an oscillating circuit such as a 2-transformer type of self-excited oscillator is employed for driving an inverter. The first controlling circuit turns the first switching element on/off in a predetermined cycle according to an output from the oscillating circuit. A second controlling circuit turns the second switching element on during the off interval of the first switching element in response to the output from the oscillating circuit. An adjustment of an input to the load is performed by varying a time period of a driving signal which is applied to the second switching element from the second controlling circuit. In the present embodiment, a power source for the second controlling circuit can be produced from the output of the oscillating circuit. Accordingly, it is not necessary to provide a separate power source for a controlling circuit and thus an entire circuit can be made simple and cheap.

In another embodiment of the present invention, a system for detecting an input current to a load is employed as a second controlling circuit for driving the second switching element. The first and second switching elements comprise unidirectional switching elements such as transistors, gate turn-off thyristor (GTO) and the like, respectively, to which an unidirectional element such as a diode is connected in anti-parallel. The second controlling circuit controls the on interval of the second switching element based on a current flowing through the first and second switching elements and a current flowing through the first and second unidirectional elements. More specifically, the second switching element is driven by an output from a comparing circuit for comparing with a reference voltage a voltage corresponding to the difference between both currents.

Since the induction heating apparatus in accordance with this preferred embodiment detects a collector current of a transistor constituting a single ended push-pull inverter and a diode current and makes an input control based on the difference therebetween, it becomes possible that a power source circuit portion comprising a rectifying circuit, a choke coil and a filter capacitor is made common when a plurality of heating units are structured and thus an efficient utilization of these parts and a reduction of spaces can be achieved. Furthermore, a precise input control can be made, since the present embodiment utilizes the difference between a collector current of a transistor and a diode current precisely reflecting an input power, as compared with an already existing cooking apparatus which makes an input control based on a detected input current.

If, as a further embodiment, it is adapted such that a variation of an input power source voltage is detected and an input power is modified by the amount of the variation, a risk is eliminated that, since no protection to a variation of a power source voltage is so far provided, a higher voltage than a stationary voltage is applied to an apparatus and hence the apparatus is broken, such risk having occurred in a conventional apparatus.

As described in the foregoing, in accordance with the present invention, an induction heating apparatus having a plurality of heating units can be easily made. Then, in a further preferred embodiment, a plurality of heating units each comprising an inverter and a load circuit are provided.

In a certain induction heating apparatus with multiple units, all of the heating units are driven by a single oscillating circuit. More specifically, the first and second switching elements are constituted by a PNP transistor and an NPN transistor, respectively. From an oscillator, a signal for turning the PNP transistor on/off in a predetermined cycle and a signal for turning the NPN transistor on during the off interval of the PNP transistor are outputted so that these two signals are applied to each unit through a common or a separate driving circuit. In accordance with the induction heating apparatus with multiunit, a problem of generation of beat sound due to mutual interference of units can be eliminated since the driving frequency for each heating unit can be made constant. In addition, since an emitter of a PNP type transistor is connected to a high electric potential side of a direct current power source, only one output winding of an oscillation driving circuit which is common to each heating unit can be provided and thus a circuit for heating unit can be simplified. Furthermore, a load circuit is connected in parallel with the transistor on the side of a high electric potential end of a power source voltage so that the on/off interval of a transistor on the side of the low electric potential end can be variably controlled and hence it is possible to adjust a power under the condition of a constant driving frequency.

In prior art induction heating apparatus with multiple units, an inverter included in each of the heating units with operated in a different phase or at a different timing with respect to each other. In this case, there is an advantage that a capacity of a smoothing capacitor constituting a direct current source together with a rectifying circuit can be made small. More particularly, prior art induction heating apparatus with multiple units can average the current flow of a filter capacitor in the power source circuit. This permits the use of a capacitor having a small allowable ripple current, since in driving a plurality of heating units structured by an SEPP inverter by the same power source, the operating timing is made different for each heating unit.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
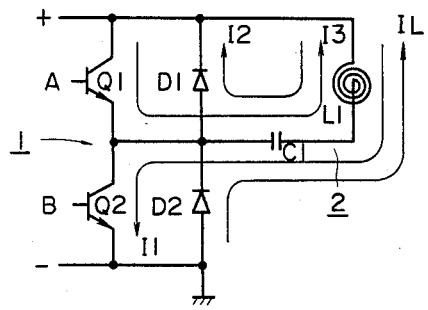
FIG. 1 is a circuit diagram showing an SEPP inverter used in the present invention.

FIG. 1 shows a circuit diagram of an SEPP inverter 1 used in the present invention, wherein first and second transistors Q1 and Q2 which are first and second switching elements, respectively, are connected in series between a high electrical potential end and a low electrical potential end of a direct current power source, both transistors being NPN type of transistor. A gate turn-off thyristor and the like, other than transistors, may be used as the first and second switching elements. D1 and D2 are freewheel diodes connected in anti-parallel with the first and second transistors Q1 and Q2, and 2 is a load circuit connected in parallel with the first transistor Q1, which load circuit comprises a induction heating coil L1 and a resonance capacitor C1. A cooking pan (not shown) made of metal, such as iron and the like, is closely disposed on the induction heating coil L1.

Figure 2:
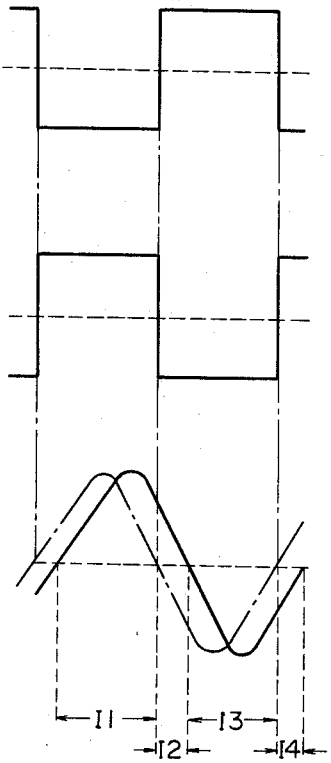
FIGS. 2 and 3 are waveform charts for explaining an operation of the FIG. 1 circuit.

FIG. 2 shows a waveform chart for the operation thereof, wherein on/off signals A and B are applied to bases of the first and second transistors Q1 and Q2, respectively. First, if and when the second transistor Q2 is turned on by the signal B, a driving current I1 flows through the induction heating coil L1, the resonance capacitor C1 and the second transistor Q2. If and when the second transistor Q2 becomes off and the first transistor Q1 becomes on, a circulating current I2 flows through the induction heating coil L1, the resonance capacitor C1 and the diode D1. If and when the circulating current I2 becomes zero, a current flowing through the load circuit 2 is inverted, a driving current I3 flows through the first transistor Q1, the resonance capacitor C1 and the induction heating coil L1. Subsequently, once again the second transistor Q2 becomes on and the first transistor Q1 becomes off; however, a circulating current I4 flows through the diode D2, the resonance capacitor C1 and the induction heating coil L1 for a while. Meanwhile, in FIG. 2(C), a solid line indicates a case of lag and a dotted chain line indicates a case of in-phase. In case of in-phase, no circulating currents I2 and I4 flow. Whether it is in-phase, lag or a phase advance depends on a kind of a cooking pan, that is, an effective inductance of the coil L1.

Figures 3, 5:
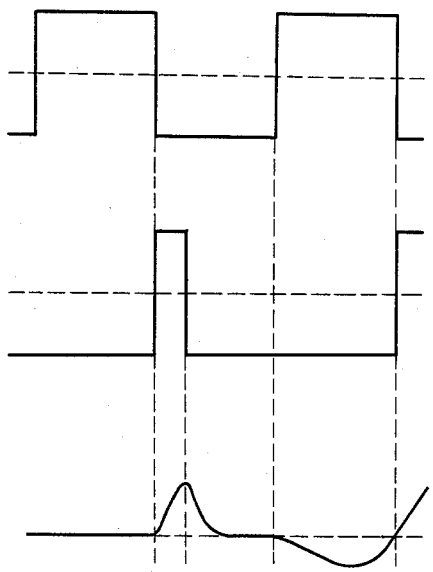
FIG. 5 is a waveform chart for explaining an operation of the FIG. 4 embodiment.

FIG. 3 shows waveforms of load currents in case where on and off intervals of the first transistor Q1 are made equal while an on interval of the second transistor Q2 is controlled by a duty cycle in the off interval of the first transistor Q1. A current value can be arbitrarily controlled in which the off interval of the first transistor Q1 is used as a maximum of the on interval of the second transistor Q2 and zero is used as a minimum. Since an emitter potential of the first transistor Q1 unstably varies, the control of the duty cycle is difficult and thus a complicated circuit is required to do so, while since an emitter potential of the second transistor Q2 is fixed to a low electric potential (ground potential), the control of the duly cycle thereof is easy. Accordingly, the start from a shorter state of the on interval of the second transistor Q2 can be easily achieved at the time of start of oscillation and thus the load of the transistor due to a large current which is easily generated at the time of start and a surge voltage at the time of interruption of current can be reduced.

An SEPP inverter used in the present invention is different from a conventional typical SEPP inverter in that one end of a load circuit is connected to a high electric potential side of a direct current power source (a ripple current power source may be used). An induction heating cooking apparatus using a conventional typical SEPP inverter is disclosed in, for example, Japanese Patent Laying Open Gazette No. 65447/1976 which was laid open, June 7, 1976, for public inspection, wherein one end of a load circuit is connected in parallel with a low electric potential side which corresponds to the transistor Q2 in the circuit of FIG. 1. However, in this conventional circuit, there is a great disadvantage that a circuit for so-called soft start becomes complicated or a transistor with a larger rating must be used.

It is assumed that the load circuit 2 is connected in parallel with the second transistor Q2 in the FIG. 1 circuit. In this case, an amount of energy to be supplied to the load circuit 2 is determined depending on the on interval of the first transistor Q1. Thus, in order to adjust an output, it is necessary to control an on/off of the transistor Q1. Prior to turning a power source on, no energy is stored in the induction heating coil L1 and the resonance capacitor C1. Thus, upon turning the power supply on, at the same time a rush current flows into the coil L1 and the capacitor C1. The rush current must be made as small as possible since the rush current causes the transistor Q1 to be broken. In order to make the rush current small, the on interval of the transistor Q1 must be made smaller than the stationary state immediately after turning the power source on. However, it is very difficult to make a control of a duty cycle of the transistor Q1. The reason is that the emitter of the transistor Q1 is not connected to a reference voltage potential and thus it is, so to speak, is in a floating state. Thus, the on/off control of a transistor which emitter is in a floating state requires a very much complicated circuit. Accordingly, in the conventional SEPP inverter, a soft start could not be eventually performed.

In this respect, in accordance with the SEPP inverter shown in FIG. 1, for the purpose of a soft start, it is sufficient to make a control of the duty cycle of only the second transistor Q2 and thus it is easily possible to perform a soft start. Therefore, the difference between the SEPP inverter in FIG. 1 and the conventional one is not only the point that the manner of connection of the load circuit is different from each other, but also must be evaluated in the light of simplicity and economics of a circuit required as a cooking apparatus, in particular. This is a significant different point sufficient to prove that the FIG. 1 circuit is not a mear change of designing matter of the conventional circuit.

Figure 4:
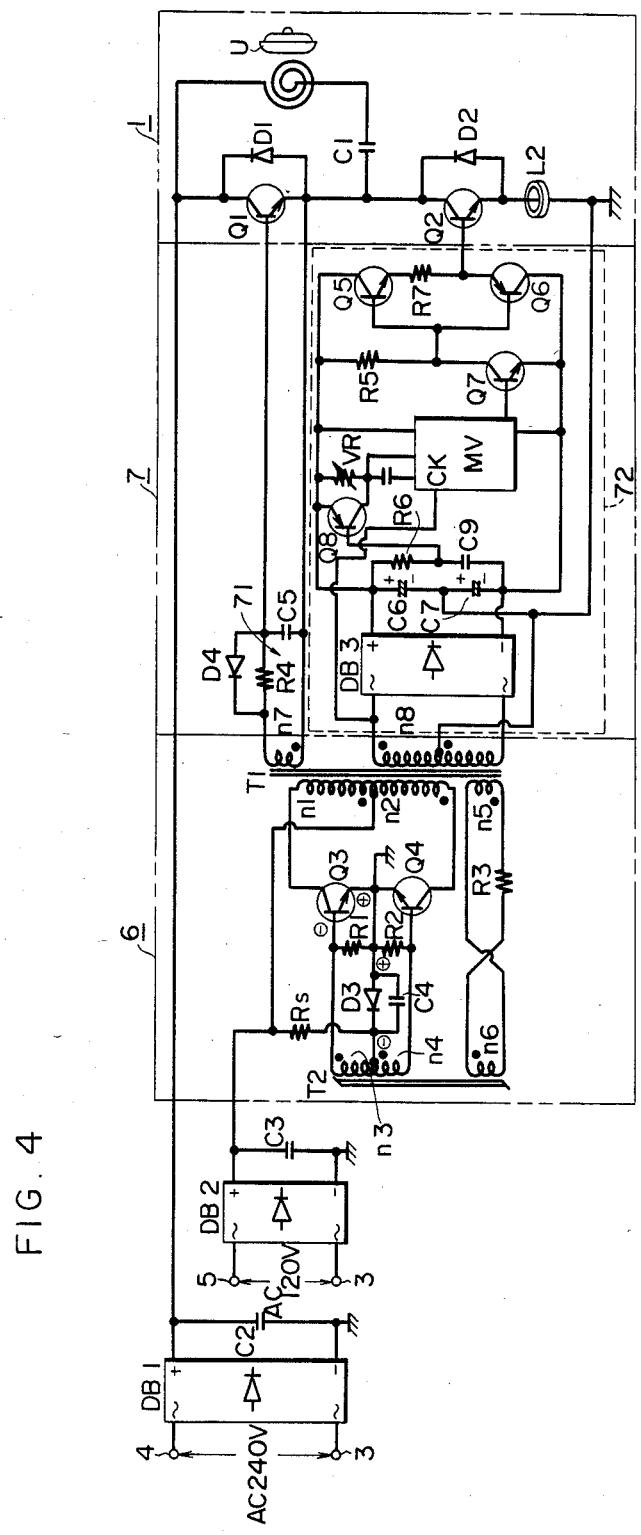
FIG. 4 is a circuit diagram showing an embodiment of the present invention.

FIG. 4 shows a circuit diagram of an embodiment of the present invention wherein 3 and 4 are power source terminals to which an alternating current 240 V is applied, 3 and 5 are power source terminals to which an alternating current 120 V is applied, DB1 is a rectifying circuit for rectifying an inputted alternating current 240 V, and C2 is a smoothing capacitor which capacity is small for the purpose of improvement of power factor. Thus, the output from the smoothing capacitor C2 indicates a ripple current which is little smoothed. DB2 is a rectifying circuit receiving an alternating current 120 V and rectifying the same, and C3 is a smoothing capacitor having a high capacity. Thus, the output from the smoothing capacitor C3 is nearly a pure direct current having a low ripple. A terminal voltage of the capacitor C2 is inputted to an SEPP inverter 1 and a terminal voltage of the capacitor C3 is inputted to an oscillating circuit 6.

Since the structure of the SEPP inverter 1 was described in the foregoing, the explanation thereof is omitted. Incidentally, U is a cooking pan which is electromagnetically coupled to the induction heating coil L1 and, L2 is an inductance element, for example, a toroidal core, for preventing a surge current.

The oscillating circuit 6 is structured by a 2-transformer type of self-excited oscillator. T1 is a first transformer. Two transistors Q3 and Q4 having the same characteristics are connected with each other in a complementary manner and each of the primary windings is constituted by each of collector windings n1 and n2. Emitters of the respective transistors Q3 and Q4 are connected in common and connected to the smoothing capacitor C3. T2 is a second transformer, which secondary winding is constituted by base windings n3 and n4 of the transistors Q3 and Q4. R1 and R2 are resistors interposed between base and emitter of the transistors Q3 and Q4, Rs is a starting resistor, D3 and C4 are a diode and a capacitor, respectively, which are connected in parallel and are interposed between the base windings n3 and n4 of the second transformer T2 and the emitters of the transistors Q3 and Q4, wherein the diode D3 is used for prevention of a reverse current and the capacitor C4 is used for the purpose of making the switching speed up. A reference character n5 denotes a positive feedback winding of the first transformer T1, the output therefrom being connected to a primary winding n6 of the second transformer T2 through a resistor R3. The second transformer T2 is a so-called saturation transformer which is possible to be used to the saturated region. Reference characters n7 and n8 denote secondary windings of the first transformer T1, the output thereof being applied to a controlling circuit 7. The oscillation frequency of the oscillating circuit 6 is set to super audible frequency, that is, a value more than above 20 kHz.

In the controlling circuit 7, the output of a secondary winding n7 of the first transformer T1 is inputted between the base and emitter of a first transistor Q1 through a delay circuit or a first controlling circuit 71 comprising the resistor R4 and the capacitor C5. D4 is a diode interposed so as to quickly perform a turn off of the first transistor Q1. DB3 included in a second controlling circuit 72 is a rectifying circuit for full-wave rectifying an output of the secondary winding n8 and comprises a diode bridge. C6 and C7 are smoothing capacitors, the junction thereof being connected to a common terminal of the secondary winding n8, so that positive and negative voltages with respect to the above described common terminal can be obtained in the terminals of each of the capacitors C6 and C7. The common terminal is grounded together with an emitter of a second transistor Q2. Q5 and Q6 are a pair of transistors constituting a complementary circuit, wherein a terminal voltage at the positive side of the capacitor C6 is applied to the collector of the transistor Q5 and a terminal voltage at the negative side of the capacitor C7 is applied to the collector of the transistor Q6. An emitter of the transistor Q5 and an emitter of the transistor Q6 are connected to, through the resistor R7 and directly, respectively, to the base of the second transistor Q2. MV is a monostable multivibrator receiving an output from the secondary winding n8 and outputting a low level signal for a predetermined period at the same time of rising of an input signal, the period of the output being set and arbitrarily adjusted by a variable resistor VR and a capacitor C8. Q7 is a transistor which becomes off when the above described low level signal is applied to the base thereof, the collector thereof being connected to the bases of the transistors Q5 and Q6 and also being connected to the positive side terminal of the capacitor C6 through the resistor R5 and the emitter thereof being connected the negative side terminal of the capacitor C7. R6 and C9 are a resistor and a capacitor, respectively, connected to both terminals of the series connection of the capacitors C6 and C7, the terminal voltage of the capacitor C9 being applied to the base of the transistor Q8. The emitter-collector of the transistor Q8 is connected in parallel with the variable resistor VR, so that the variable resistor VR is short-circuited when the transistor Q8 is in an on state. More particularly, for a short period until the capacitor C9 reaches a predetermined electric potential at the time of the start of oscillation of the inverter, the transistor Q8 is turned on and hence the variable resistor VR is short-circuited, and as a result, the width of the output pulse from the monostable multivibrator MV is reduced. That is, the transistor Q8, the capacitor C9 and the resistor R6 are employed for performing a so-called soft start.

Next, the operation of the above described structure will be explained.

First, the oscillating circuit 6 will be described. Assuming that the transistor Q3 is rendered conductive by a direct current voltage obtained in the terminal of the smoothing capacitor C3, a current begins to flow between the collector and emitter thereof and an induced voltage is caused in the collector winding n5, the induced voltage causing a further induced voltage in the base winding n3 of the transistor Q3 through the primary winding n6 of the second transformer T2. The voltage causes the transistor Q3 to make a positive feedback, so that a conductive state is made complete by a sufficient base current. The current flowing into the resistor R3 increases due to a primary inductance of the second transformer T2 and become a saturated state. As a result, a current on the primary side of the second transformer T2 quickly increases and a voltage drop in both terminals of the resistor R3 increases, so that the voltage across both terminals of the primary winding n6 of the second transformer T2 decreases and a feedback voltage decreases. Thus, a voltage of the capacitor C4 is applied to the base of the transistor Q3 in the polarity as shown and the transistor Q3 is cut off, so that the transistor Q4 starts to be conductive. As a result, a feedback action occurs in the direction opposite to the previous state and thus the transistor Q3 becomes off and the transistor Q4 becomes on. The primary current of the second transformer T2 becomes opposite and thus the transistor Q4 becomes on in the same manner as the transistor Q3 previously became on. In such a way, a self-excited oscillation continues. Since two collector windings n1 and n2 of the first transformer T1 are electromagnetically coupled to the secondary windings n7 and n8, respectively, rectangular pulses are alternately obtained in the secondary windings n7 and n8 in response to the on and off of the transistors Q3 and Q4. FIG. 5 (A) shows such waveform, wherein it becomes a high electric potential level when the transistor Q3 is on and becomes a low electric potential level when the transistor Q3 is off.

An inverted signal of the waveform (A) is obtained in the output of the secondary winding n8. The output signal is rectified and smoothed through the rectifying circuit DB3 and the smoothing capacitors C6 and C7 and supplied as a driving voltage to the transistors Q5 and Q6 in the complementary manner. The monostable multivibrator MV operates in synchronism with the rising of the above described output and outputs a low electric potential signal during the period set by the variable resistor VR. The outputs from the monostable multivibrator MV in cases where the duty is 50% and the duty is less than 50% are, respectively, shown in the waveforms (C) and (C') in FIG. 5. Since, during this period, the transistor Q7 becomes off and hence the transistor Q5 becomes on and the transistor Q6 becomes off, the second transistor Q2 becomes on. In FIG. 5, the waveform (B) shows a base current of the first transistor Q1 and the waveforms (D) and (D') show the base currents of the second transistor Q2 corresponding to the waveforms (C) and (C').

In the induction heat cooking apparatus in the present embodiment, the on and off intervals of the first transistor Q1 is fixed to one to one ratio, while the on and off intervals of the second transistor Q2 are arbitrarily variable from 0% to 100% within the off interval of the first transistor Q1, so that an input to the cooking pan can be freely set to extent of several watts to about 1500 watts. The maximum value of the input is determined by a breakdown voltage of the switching elements Q1 and Q2 or the factors such as a current capacity commercially supplied to a general home. A control signal to the monostable multivibrator MV is applied from the output from the oscillating circuit 6 and thus it is possible to make the operating timing of the second transistor Q2 coincide with that of the first transistor Q1. A driving power source for the two transistors Q5 and Q6 connected in a complementary manner, which drives the second transistor Q2, can be obtained from the output winding of the first transformer T1 and hence, a power transformer which is often used for obtaining a power source for controlling circuit is not needed.

Figure 6:
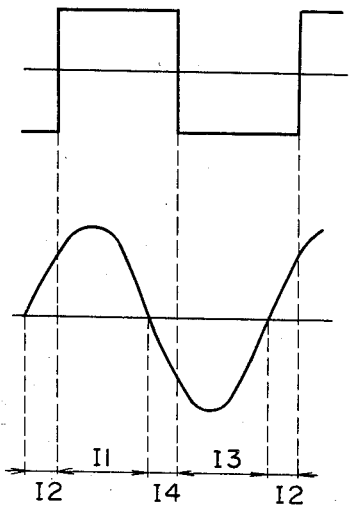
FIGS. 6 to 8 are waveform charts for explaining an action of a toroidal core.
Figure 7:
Figure 7:
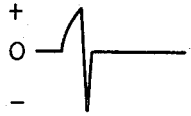
Figure 8:
Figure 8:

Next, the function of the toroidal core L2 will be described. In the stationary state of heating, an SEPP inverter 1 operates as shown in FIGS. 1 and 2. At that time, a resonance frequency f of the induction heating coil L1, an impedance of the cooking pan U (referred to as an equivalent impedance hereafter) and the resonance capacitor C1 is smaller than the oscillation frequency $f_0$ ($f<f_0$). Thus nothing unusual occurs at the time of current communication from the freewheel diode D2 to the second transistor Q2. However, in case where a cooking pan, which equivalent impedance becomes small as shown in FIG. 6, for example, a pan made of aluminum is heated, the resonance frequency f thereof becomes larger than the oscillation frequency $f_0$ ($f>f_0$) and a load current becomes in an advance phase. In case of such current phase, a surge current as shown in FIG. 7 is generated at the time of current communication from the freewheel diode D1 to the second transistor Q2. In FIG. 7, a waveform (A) shows a collector current waveform of the second transistor Q2 and the waveform (B) shows a current waveform of the freewheel diode D1. These surge currents are as large as several times of a peak value of the load current and hence cause a noise generation and deterioration of the switching transistors. The cause of the surge current generation will be described with reference to FIG. 8. FIG. 8 shows a waveforms of the base voltage (A) and base current (B) of the transistor. In order to enhance the switching speed of the transistor, it is usual that a positive or negative voltage is applied to the base thereof. Accordingly, if and when the transistors is turned off by inverting the base voltage of the transistor which is in an on state from the positive voltage to the negative one, a surge current $I_{B2}$ having an abrupt peak flows. The current $I_{B2}$ is a current which is caused when electric charges stored between the base and emitter of the transistor are instantaneously discharged. In the figure, a current $I_{B1}$ is a base current which flows when the transistor is in an on state. Such surge currents are also generated in the freewheel diode D2. The surge current is generally called a recovery current. Considering this with reference to the FIG. 1 circuit, first a circulating current I2 flows and the freewheel diode D1 is biased in a forward direction. If and when the second transistor Q2 is rendered conductive, the diode D2 is back-biased. Accordingly, a recovery current flows into the diode D1.

In the present embodiment, in order to absorb such surge currents, a small type of toroidal core L2 is inserted in the current paths of the second transistor Q2 and the diode D2. An inductance is applied to the current path by the toroidal core L2, which inductance contributes to supressing an abrupt change of the current. The surge current can be reduced to about 1/10 by inserting the toroidal core L2. The position where the toroidal core L2 is inserted may be in the current paths of the first transistor Q1 and freewheel diode D1 and other inductance element other than the toroidal core may be used.

As described in the foregoing, the induction heat cooking apparatus in accordance with the present embodiment, is adapted such that a load circuit is provided in parallel with the first switching element disposed at the high electric potential side of the SEPP inverter and the second switching element connected to the low electric potential side fixed to a predetermined value is controlled by the duty cycle so that an input to the load is controlled and hence as compared with the control of the first switching element which terminal voltage is unstable, the controlling circuit therefor is largely simplified.

Figure 9:
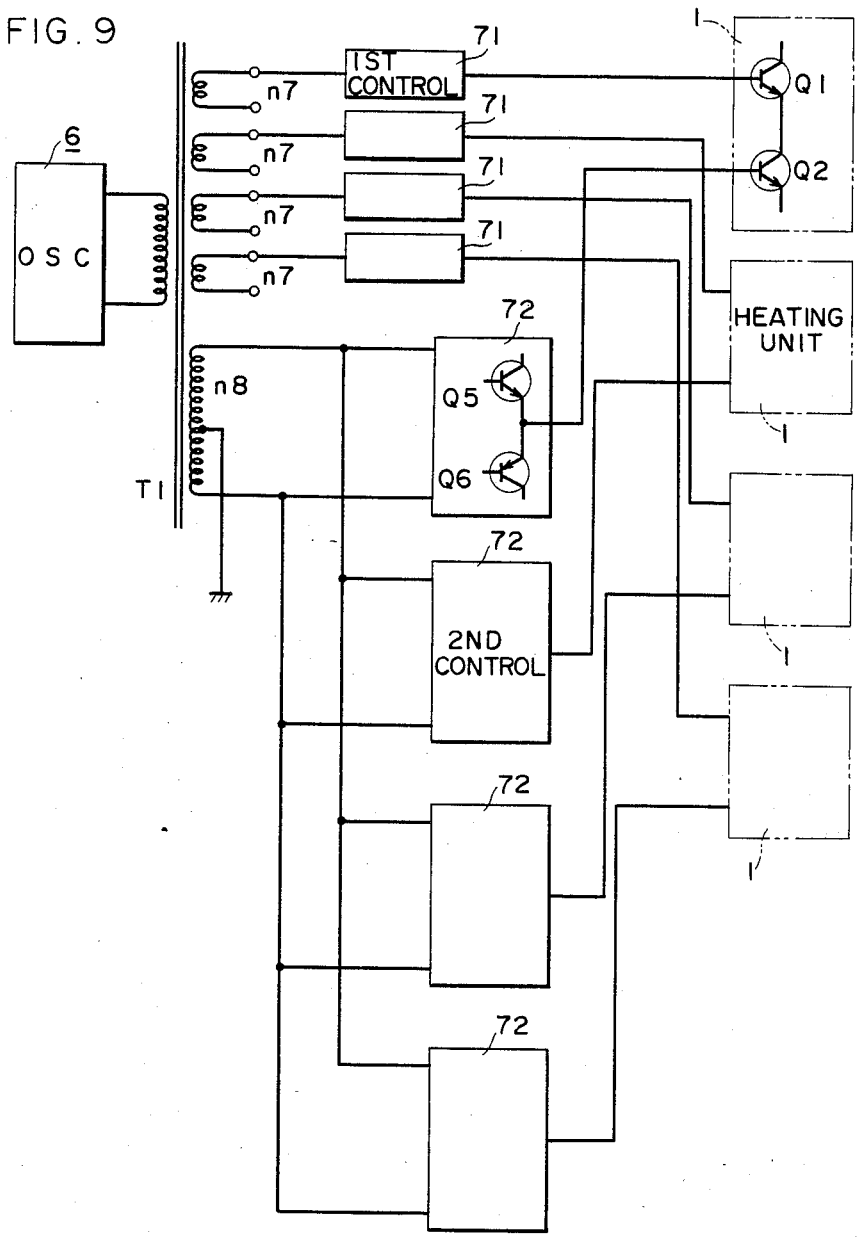
FIG. 9 is a block diagram showing a multiunit induction heating apparatus as another embodiment of the present invention.

FIG. 9 is a block diagram showing an induction heating apparatus, as another embodiment of the present invention, having a plurality of heating units. The remaining portions as not shown in FIG. 9 are the same as the FIG. 4 circuit. A transformer T1 constituting an oscillating circuit 6 comprises four first outputs windings n7 and one second outputs winding n8. The four output windings n7 are connected, respectively, to bases of the first transistors Q1 in the corresponding heating units 1 through the corresponding first controlling circuits or delay circuits 71. The delay circuits 71 may be the same as the FIG. 4 embodiment. Four second controlling circuits 72 are connected to one second output winding n8. The second controlling circuits 72 may also be the same as the FIG. 4 embodiment, each of the outputs therefrom being connected to the base of the second transistor Q2 in a corresponding unit 1. Each of the second controlling circuits 72 includes a varible resistor VR (FIG. 4) for adjusting an output.

In the FIG. 9 embodiment, an operating frequency of each of the heating units 1 is the same, since the first transistors Q1 are driven by the output from the common oscillating circuit 6 and the frequecy is unconditionally determined by the repetition of the on/off of the transistor Q1. Accordingly, no audible noise is generated due to the difference between operating frequencies of the heating units. On the other hand, the output from each of the heating units 1 can be independently controlled by a variable resistor in the corresponding second controlling circuit 72. The common use of the output winding n8 of the transformer T1 eliminates necessity of using a transformer having so many windings and thus the present embodiment becomes practical.

Figure 10:
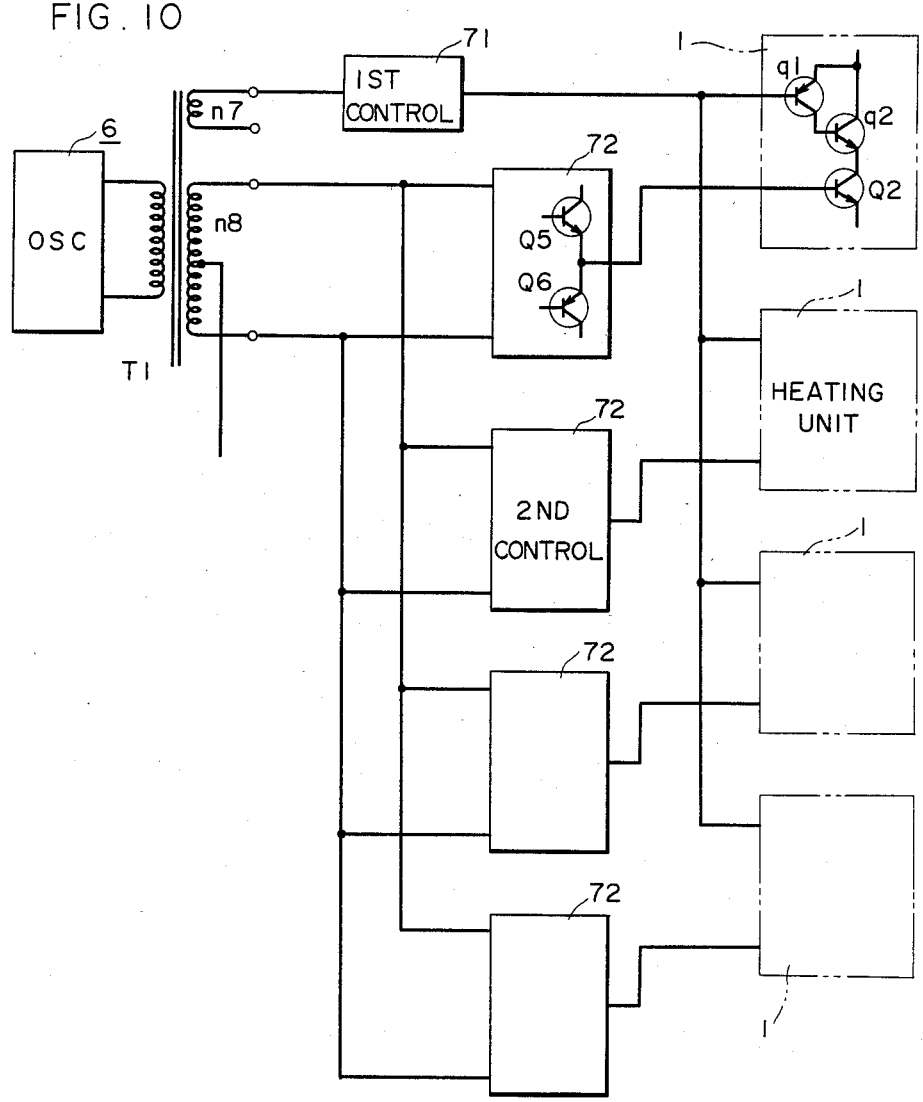
FIG. 10 is a block diagram showing a modification of the FIG. 9 embodiment.

FIG. 10 is a block diagram showing a modification of FIG. 9. The embodiment is different from the FIG. 9 embodiment in that a semi-complementary SEPP inverter is used as an SEPP inverter of the heating unit 1 and the transformer T1 comprise a single first output winding n7 which is commonly used in each unit. The semi-complementary SEPP inverter is structured by a PNP transistor q1 and an NPN transistor q2, which are connected in a Darlington connection manner, and an NPN transistor Q2 connected in series therewith. It is also possible to constitute an complementary SEPP inverter by a single PNP transistor for the transistors q1 and q2. If and when two transistors q1 and q2 are used, there is an advantage that it is cheap as compared with a case where a single PNP transistor with large capacity is used.

Thus, if a complementary or semi-complementary circuit is used as an SEPP inverter, it is possible to drive all of them by means of a single first controlling circuit 71, since electric potentials of emitters of the first transistors Q1 (q1, q2) are common. Accordingly, in the FIG. 10 embodiment, the number of the windings of the transformer T1 in the oscillating circuit 6 can be reduced as compared with the FIG. 9 embodiment. Second controlling circuit 72 may be the same as the FIG. 9 or FIG. 4 embodiment.

Figure 11:
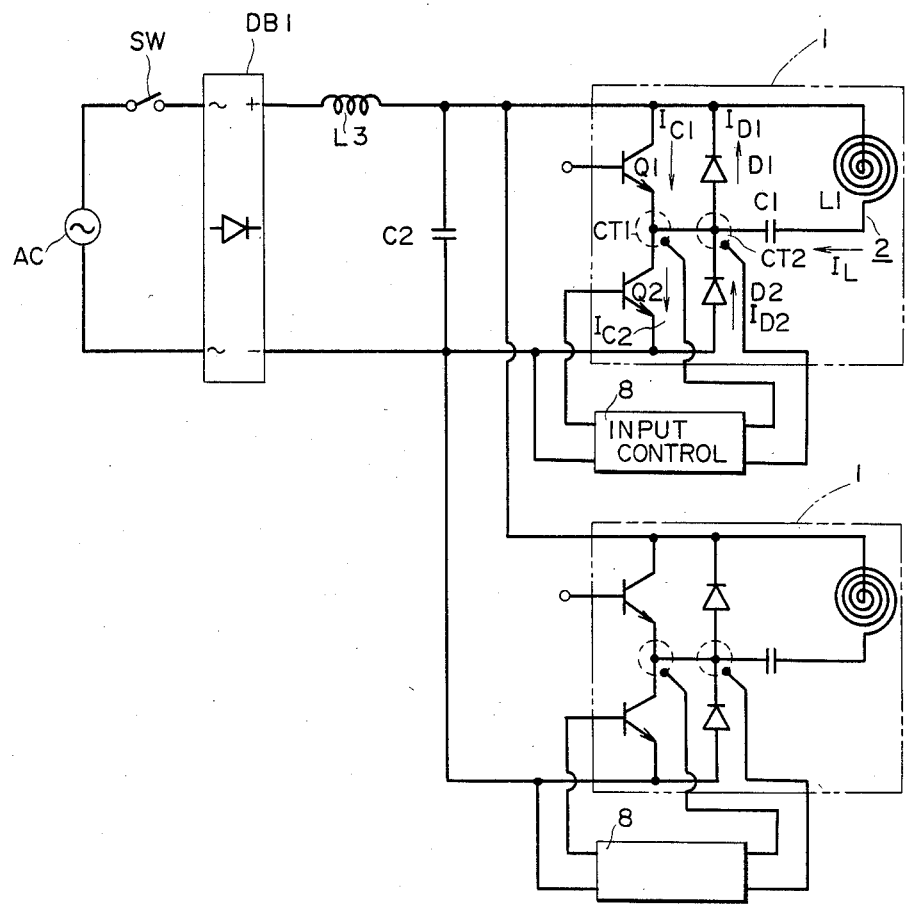
FIG. 11 is a circuit diagram showing a further embodiment of the present invention.

FIG. 11 is a circuit diagram showing a further embodiment of the present invention. In FIG. 11, AC is a common alternating current power source, 1, 1 are heating units which comprise a common power switch SW. Since the first and second heating units have the same structure, only the first heating unit will be described hereinafter. DB1 is a rectifying circuit, L3 is a choke coil and C2 is a filter capacitor. The heating unit 1 comprises first and second transistors Q1 and Q2, a series resonance circuit or a load circuit 2 connected in parallel with the first transistor Q1, comprising an induction heating coil L1 and a resonance capacitor C1, and diodes D1 and D2 connected in anti-parallel with the transistors Q1 and Q2, respectively. A cooking pan which is a load is closely disposed to the induction heating coil L1. CT1 is a current transformer for detecting collector currents of the first and second transistors Q1 and Q2, CT2 is a current transformer for detecting currents flowing into the diodes D1 and D2, and 8 is an input controlling circuit for controlling a conduction period of the second transistor Q2 based on the current signals detected by these current transformers CT1 and CT2.

Meanwhile, the first and second transistors Q1 and Q2 are alternately rendered conductive, wherein the ratio of the on and off time period of the first transistor Q1 is one to one and the on time period of the second transistor Q2 is arbitrarily changed within the off time period or interval of the first transistor Q1.

The inventors already confirmed that an input power to the SEPP inverter or a heating unit 1 is proportional to the difference between a mean value of the collector currents $I_{C1}$ and $I_{C2}$ flowing into the first and second transistors Q1 and Q2, and a mean value of the currents $I_{D1}$ and $I_{D2}$ flowing into the diodes D1 and D2 and an input controlling circuit 8 relating to the present embodiment applies such principle.

Figure 12:
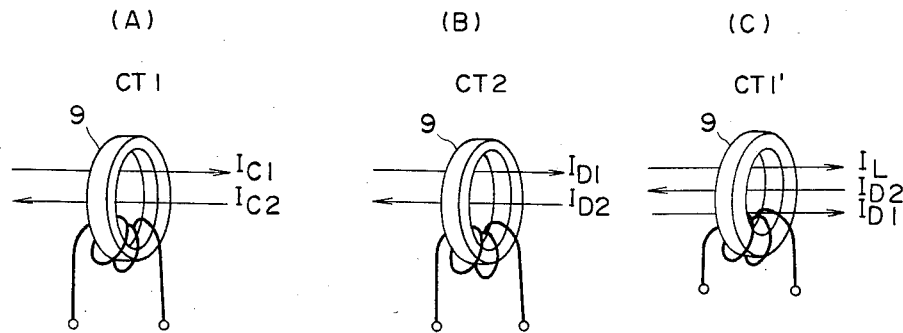
FIG. 12 is a diagramatic drawing for explaining a current detecting operation in the FIG. 11 embodiment.

Lines in which the collector currents $I_{C1}$ and $I_{C2}$ of the first and second transistors Q1 and Q2 are wired in a core 9 of the current transformer CT1 so that the flowing directions are opposite to each other as shown in FIG. 12 (A). Similarly, lines in which currents $I_{D1}$ and $I_{D2}$ flowing into the diodes D1 and D2 are wired in the core 9 of the current transformer CT2 so that the flowing directions are opposite to each other as shown in FIG. 12 (B). FIG. 12 (C) shows a modification of a collector current detecting circuit, wherein a line in which a current $I_{D1}$ flows into the diode D1 and a line in which a current $I_{D2}$ flows into the diode D2 are disposed in a forward direction and in a backward direction, respectively, with respect to the direction of the load current $I_L$ flowing into the series resonance circuit 2.

Figure 13:
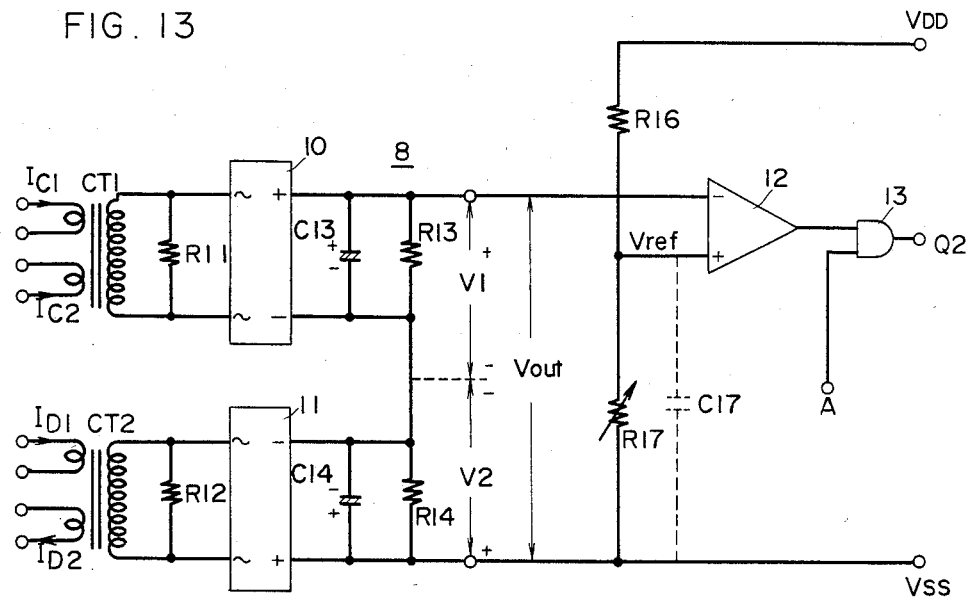
FIG. 13 is a circuit diagram showing an example of an input controlling circuit.

FIG. 13 shows a specific embodiment of the input controlling circuit 8, wherein CT1 and CT2 are the above described current transformers, R11 and R12 are resistors for converting a current signal to a voltage signal, 10 and 11 are rectifying circuits, C13 and C14 are smoothing capacitors, R13 and R14 are resistors connected between terminals of the smoothing capacitors C13 and C14, respectively, the voltages V1 and V2 being obtained between the respective terminals. The voltage V1 is a voltage proportional to a mean value of collector currents and the voltage V2 is a voltage proportional to a mean value of diode currents. Wiring is disposed such that the voltage V2 is of a polarity opposite to the voltage V1. Thus, the following voltage is obtained, as an output voltage Vout, between the resistors R13 and R14, that is, Vout = V1 − V2

As far as the SEPP inverter is concerned, an equivalent inductance of a pan and an induction heating coil largely changes with respect to the material of the pan in case where a frequency is constant, and thus the current flowing into the induction heating coil L1 causes three modes of in-phase, lag and advance phase. For this reason, the mean value of the currents of the induction heating coil L1 is not proportional to an input power. Therefore, a precise detection of an input cannot be performed even if only a load current is detected, it is necessary to add to the detected input a current flowing into the diode D1, while subtracting a current flowing into the diode D2. 12 is a comparator to which − input terminal the voltage Vout is applied and to which + input terminal a predetermined reference voltage level Vref is applied, the comparator operating such that if the relation Vout > Vref is established, a conduction period controlling circuit 13 in the next stage reduces the conduction period of the second transistor Q2, that is, the output is reduced, and if the relation Vout < Vref is established, the conduction period of the second transistor Q2 becomes longer and thus the output increases. In such a way, an input control is made. Meanwhile, the above described conduction period controlling circuit 13 may be an AND gate receiving as one input thereof the output from the comparator 12 and also receiving as the other input a signal which becomes high-level in the off interval of the first transistor Q1, for example and applying the output thereof to the base of the second transistor Q2. Accordingly, the conduction period of the transistor Q2 can be controlled by the output from the comparator 12.

In the FIG. 13 embodiment, in order to obtain + input Vref to the comparator 12, just as FIG. 14 embodiment described subsequently, a voltage dividing circuit comprising a resistors R16 and R17 is used. Since $V_{DD}$ and $V_{SS}$ are constant voltages, the reference input Vref is also constant.

The reference voltage Vref may be made variable so that the output can be manually adjusted by controlling the conduction period of the second transistor Q2 in the SEPP inverter. In order to vary the reference input Vref, the resistor R17 constituting a voltage dividing circuit is made as a variable resistor. Then, if and when the resistance value of the variable resistor R17 is made larger, the reference input Vref becomes larger and thus the control input Vout relatively becomes smaller, and hence the conduction period controlling circuit 13 makes the conduction period of the second transistor Q2 longer. To the contrary, if and when the resistance value of the variable resistor R17 is made smaller, the conduction period of the transistor Q2 becomes shorter and the output becomes small.

The following table indicates values of input power in case where some kinds of pans are heated in conventional examples without the above described input controlling function, and the present embodiment. In the conventional examples, a cast-metal pan is used as a reference and an input of 1350 W is provided to this pan, whereas in the present embodiment, an input of 1300 W is provided to a cast-metal pan.

|  | input power (W) | |
| --- | --- | --- |
| pan | conventional example | embodiment |
| cast-metal pan | 1350 | 1300 |
| enameled pan | 1600 | 1300 |
| stainless copper bottom pan | 1425 | 1350 |
| Altight made frying pan | 1650 | 1300 |

-continued

| pan | input power (W) | |
| --- | --- | --- |
| | conventional example | embodiment |
| 18-8 stainless pan | 2050 | 1350 |
| difference between maximum and minimum | 700 | 50 |

It should be understood from this table that in the present embodiment of the present invention, the difference of input power caused depending on the kind of the pan is 50 W, which is an extremely precise input value.

Figure 14:
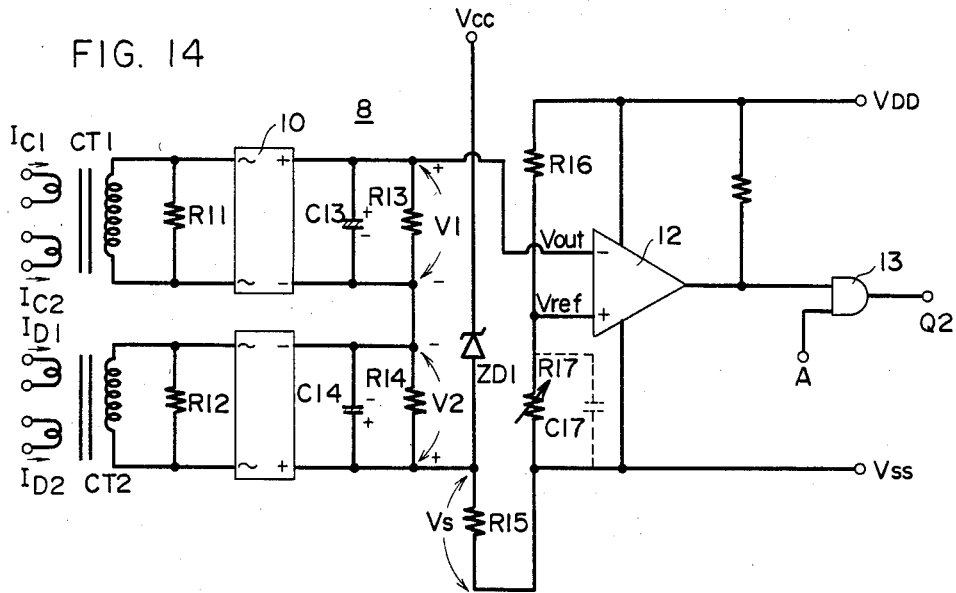
FIG. 14 is a circuit diagram showing another example of an input controlling circuit.

FIG. 14 is a circuit diagram showing other example of the input controlling circuit. The present embodiment is adapted such that, in making an input power control, taking it into consideration that an input power fluctuates according to a fluctuation of a supply voltage, a correction is made so as to cancel such fluctuation of the power source. Usually, the input power of this kind of cooking apparatus increases or decreases in proportion to square of an input voltage if a load is constant. More particularly, in case where a voltage fluctuation of +10% occurs in a power source of an alternating current 100 V, a fluctuation of approximately ±20% appears in an input power. Even if an alternating current electric current or a load current is detected so that the current is controlled to be constant, a power changes in proportion to the fluctuation of the voltage. For example, if the voltage changes by 10%, the power also changes by 10%. Therefore, if the number of heating units increases, such amount of the change is added and hence such amount of the change is not negligible. The present invention is directed to prevent generation of the power fluctuation.

The present embodiment is different from the FIG. 13 embodiment in that a zener diode ZD1 and a resistor R15 are provided. ZD1 is a zener diode connected between a voltage Vcc including a fluctuation in response to the fluctuation of supply voltage, and a terminal of a high electric potential side of the resistor R14, and R15 is a resistor connected between the above described terminal and a low electric potential side $V_{SS}$ of a constant-voltage regulated power supply, the voltage Vs between both terminals thereof being added to the above described difference of the voltage signal V1−V2. Thus a voltage signal Vout(=V1−V2+Vs) appears in the terminal of the high electric potential side of the resistor R13. 12 is a comparator, to which − input terminal the voltage Vout is applied and to which + input terminal a predetermined reference voltage level Vref is applied which is dividing the constant voltage regulated power supply $V_{DD}$ by the resistors R6 and R7. More particularly, the comparator is adapted such that if the relation Vout>Vref is established, a conduction period controlling circuit 13 in the next stage reduces a conduction period of the second transistor Q2 and thus operates so as to lower the output, and if the relation Vout<Vref is established, the conduction period of the second transistor Q2 becomes longer and the output increases.

Figure 15:
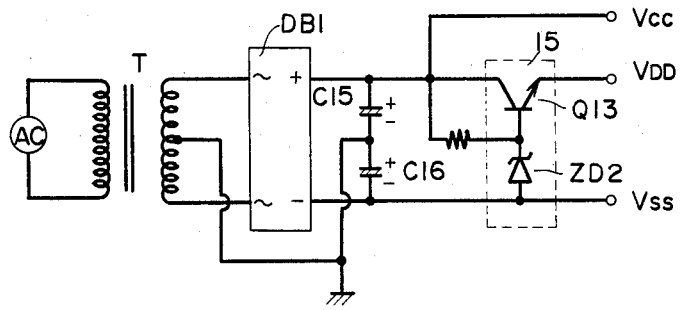
FIG. 15 shows an example of a circuit for withdrawing a voltage following a fluctuation of a power source voltage.

FIG. 15 shows a structure of a power source circuit for obtaining a voltage signal Vcc including a fluctuation of a supply voltage and constant voltages $V_{DD}$, $V_{SS}$, wherein AC is an alternating current power supply, T is a voltage reducing transformer, DB1 is a rectifying circuit, and C15 and C16 are smoothing capacitors connected in series with the output side of the rectifying circuit DB1, the intermediate point thereof being grounded. 15 is a constant-voltage regulated circuit to which terminal voltages of the smoothing capacitors C15 and C16 are inputted, and comprises a transistor Q13 and a zener diode ZD2. Constant voltages $V_{DD}$ and $V_{SS}$ are obtained on the output side of the constant voltage regulated circuit 15. The voltage Vcc is a voltage withdrawn from a cathode side of the zener diode ZD2 and is not constant-voltage regulated, and hence increases or decreases in proportion to an average value of an input voltage.

Meanwhile, instead of the alternating current voltage source AC, the transformer T and the rectifying circuit DB1 shown in FIG. 15, the oscillating circuit 6, the transformer T1 of the oscillating circuit 6 and the rectifying circuit DB3 shown in FIG. 4 may be used for generating the voltage Vcc and the voltage $V_{DD}$.

Figure 16:
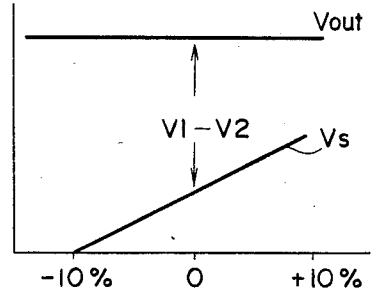
FIG. 16 is a graph showing a relation between voltages Vout and Vs.

If and when a zener voltage of the constant voltage zener diode ZD1 is made to correspond to a voltage Vcc in an input voltage AC 90 V, terminal voltage Vs of the resistor R5 indicates a voltage waveform, as shown in FIG. 16, progressively increasing from the point of 90 V. The increase of the voltage Vs causes the voltage Vout to increase so that an "H" level output period from the comparator 12 is reduced. As a result, an input power to a load decreases and a value of the voltage V1−V2 also decreases, and hence the sum of the value and the voltage Vs is kept approximately constant. In such a way, a power compensation action is made in a direction that an input power is decreased if a supply voltage increases and in a direction that an input power is increased if a supply voltage decreases.

In both of the FIG. 14 embodiment and FIG. 13 embodiment, a reference input Vref of the comparator 12 can be arbitrarily adjusted by a variable resistor R17. A so-called soft start can be achieved by connecting the capacitor C17 shown in a dotted line in FIGS. 13 and 14 in parallel with the variable resistor R17.

More particularly, if and when a supply voltage $V_{DD}$ is outputted, that is, a power source is turned on, the capacitor C17 connected in parallel with the variable resistor R17 correspondingly starts to be charged. In an earlier time of the charging, a current to the variable resistor R17 is so small that most of the current flows into the capacitor C17. Accordingly, the reference input Vref depends on the terminal voltage of the capacitor C17. In the earlier time of the charging, the terminal voltage of the capacitor C17 is so small and hence the reference input Vref is also small. For this reason, the conduction period of the transistor Q2 becomes short and hence the output is so small. Thus, a so-called soft start is achieved in turning a power source on.

If and when the capacitor C17 is charged, a current flows into the variable resistor R17 and the reference voltage Vref is determined by the variable resistor R17.

Figure 17:
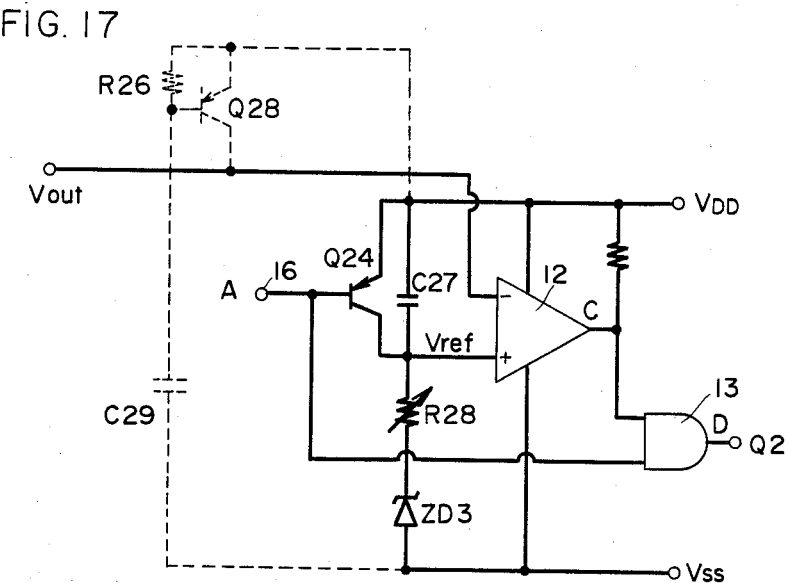
FIG. 17 is a circuit diagram showing a specific example of the input controlling circuit.

FIG. 17 shows an example of an actual driving circuit of the second transistor Q2, wherein a driving signal A of the second transistor Q2 is applied to a terminal 16. The signal A is outputted corresponding to an off interval of the first transistor Q1, the ratio of the on and off intervals being one to one. 12 is the above described comparator, to which + input terminal an output from a time constant circuit comprising a capacitor C7 and a resistor R28 is applied. ZD3 is a zener diode provided between the resistor R28 and the voltage $V_{SS}$. The zener diode ZD3 is provided such that the reference input Vref does not become less than a predetermined value. More particularly, since the maximum on interval of the second transistor Q2 becomes shorter if the reference voltage Vref lowers, the reference input Vref is made relatively larger with respect to the control input Vout so that the transistor Q2 necessarily turns on for a predetermined time period even if the reference input Vref is made small and the output is made small, whereby lowering of efficiency is prevented. Q24 is a transistor connected in parallel with the capacitor C27, the base thereof being connected to the above described terminal 16. The above described signal Vout is applied to the − input terminal of the comparator 12. 13 is an AND gate receiving an output C from the comparator 12 and a signal A, the output D thereof being applied as a conduction signal to the base of the second transistor Q2.

Figure 18:
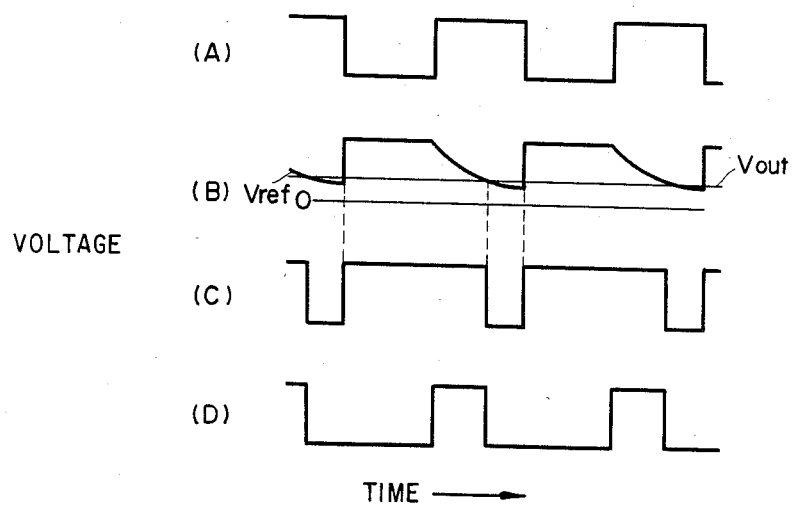
FIG. 18 is a waveform chart for explaining an operation of the FIG. 17 circuit.

FIG. 18 shows a waveform chart for explaining an operation of such structure, wherein a waveform B indicates an input signal Vout to the comparator 12 and Vref. In a time period when the signal Vout is smaller than the Vref, the output C from the comparator 12 becomes high level and thus the high level period of ANDed output D of the signal and a signal A becomes an induction period of the second transistor Q2. As a result, if and when a power voltage increases, the signal Vout increases in response to increase of the voltage Vs, and thus the high level period of the signal C becomes shorter, and as a result, the high level interval of the signal D is reduced and the conduction interval of the second transistor Q2 becomes shorter and thus an input power to a load lowers. In case where a supply voltage decreases, an operation opposite to the above described operation is made. In such a way, an input power is corrected corresponding to a fluctuation of a supply voltage.

Meanwhile, in FIG. 17, in order to adjust an output in a manual manner, the resistor R28 is structured as a variable resistor so that the reference voltage input Vref to the comparator 12 may be made variable.

In addition, in the FIG. 17 circuit, the resistor R26, capacitor C29 and transistor Q28 shown in the dotted line correspond to the resistor R6, capacitor C9 and transistor Q8 in FIG. 4, respectively, which are adapted to perform a so-called soft start. Although the capacitor C29 starts to be charged concurrently with turning a power supply on, the terminal voltage thereof is so small in an earlier time of the charging and hence the transistor Q28 is deeply conductive. For this reason, the control input Vout to the comparator 12 is forced to a relatively large voltage which is close to the voltage $V_{DD}$. Therefore, the time width of a driving signal from the comparator 12, that is, the AND gate 13 is short, the conduction period of the transistor Q2 is short and thus the output is made small. In such a way, a so-called soft start is performed.

Thereafter, as the capacitor C29 is charged, the transistor Q28 is approaching to a cutoff and the control input Vout is determined depending on the voltage $|V1-V2+Vs|$. Thus, a stationary state is obtained when a predetermined time period passes immediately after turning a power supply on.

Figure 19:
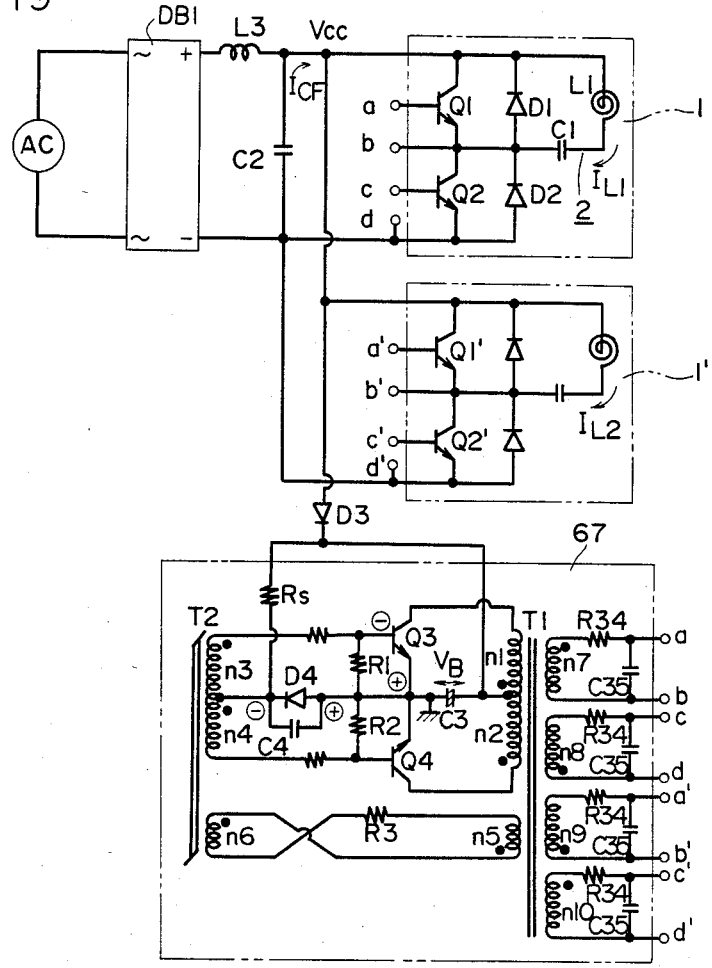
FIG. 19 is a main circuit diagram showing a further embodiment of the present invention.

FIG. 19 is a main circuit diagram showing a further embodiment of the present invention. The present embodiment is directed to a 2-unit type of induction heating cooking apparatus. In FIG. 19, AC is an alternating current, DB1 is a rectifying circuit, L3 is a choke coil, and C2 is a filter capacitor, all of which constitute a power source circuit. The filter capacitor C2 is a capacitor with small capacity which has hardly a smoothing function which mainly prevent a high frequency current from leaking to an alternating power source side. 1, 1' are first and second heating ports, that is, heating units, respectively, connected in parallel with the terminals of the capacitor C2, each of units comprising an SEPP inverter of the same structure. Explaining the structure of the first heating unit 1, Q1 and Q2 are first and second transistors serving as a pair of switching elements connected in series between a power source, D1 and D2 are diodes connected in anti-parallel between the emitter and collector of the first and second transistors Q1 and Q2, respectively, and 2 is a series resonance circuit comprising an induction heating coil L1 connected in parallel with the first transistor Q1 and a resonance capacitor C1. The first and second transistors Q1 and Q2 are alternately rendered conductive by driving signals a, b, c and d generated from a driving circuit 67 described subsequently. Driving signals a', b', c' and d' are applied to the first and second transistors Q1' and Q2' in an SEPP inverter constituting the second heating unit 1'.

A driving circuit 67 is structured by a two-transformer type of self-exciting oscillator just as the oscillating circuit 6 in FIG. 4 and the terminal voltage Vcc of the filter capacitor C2 is supplied as a driving power source through the diode D3. Reference characters n7, n8, n9 and n10 denote secondary windings of the first transformer T1, wherein a driving signals a, b, c and d for the first heating unit 1 are outputted from the windings n7 and n8 and the driving signals a', b', c' and d' for the second heating unit 1' are outputted from the windings n9 and n10. These outputs are outputted after the same is processed so that the same is prevented from being overlapped with each other through a delay circuit comprising a resistor R34 and a capacitor C35. Winding directions of the windings n9 and n10 are related such that the directions are opposite to the winding directions of the windings n7 and n8, respectively.

Figure 20:
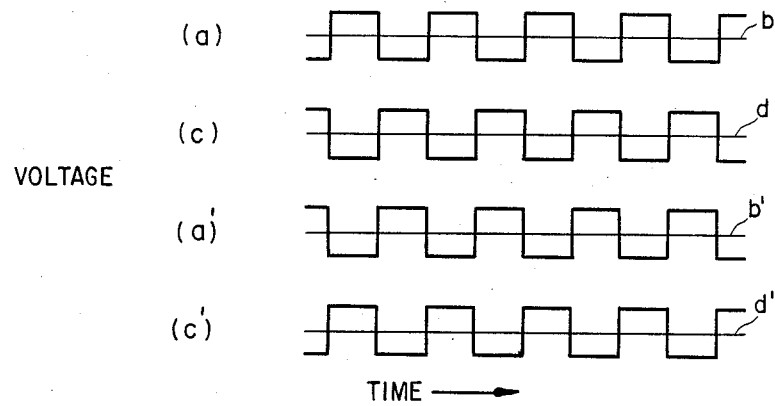
FIG. 20 is a timing chart for explaining an operation of the FIG. 19 embodiment.

An operation will be described in the following. If and when the voltage Vcc is applied to the driving circuit 67 through the diode D3, the voltage which is smoothed by the smoothing capacitor C3 becomes a ripple voltage $V_B$ rippling from about 100 V to about 140 V. Assuming that the voltage $V_B$ causes the transistor Q3 to be conductive, a current starts to flow between the collector and emitter thereof and an induced voltage is generated in the positive feedback winding n5 coupled to the collector winding n1, the induced voltage causing a further induced voltage in the base winding n3 of the transistor Q3 through the primary widing n6 of the second transformer T2. The transistor Q3 causes a positive feedback by this voltage and hence a conduction state is made perfect by a sufficient base current. A current flowing into the resistor R3 increases due to a primary inductance of the second transformer T2 and becomes a saturated state. As a result, a current on the primary side of the second transformer T2 quickly increases, a voltage drop between both terminals of the resistor R3 increases and thus, a voltage across both ends of the primary winding n6 of the second transformer T2 decreases and a feedback voltage decreases. Then, a voltage of the capacitor C4 is applied to the base of the transistor Q3 in the polarity as shown, the transistor Q3 is cut off and the transistor Q4 starts to be conductive. Feedback action occurs in a direction opposite to the previous one and thus the transistor Q3 becomes off and the transistor Q4 becomes on. A primary current of the second transformer T2 is opposite and the transistor Q4 becomes on in the same manner as the transistor Q3 previously became on. Thus, a self-excited oscillation continues. Since two collector windings n1 and n2 of the primary transformer T1 are electromagnetically coupled to the secondary windings n7, n8, n9 and n10, respectively, outputs are obtained in response to the on and off of the transistors Q3 and Q4, that is, if and when the transistor Q3 is on, the signals a, b, c' and d' are on signals and signals a', b', c and d are off signals, while if the transistor Q4 is on, the signals a, b, c' and d' are off signals and the signals a', b', c and d are on signals. The waveforms of these signals are shown in FIG. 20.

Next, an operation of the first heating unit 1 will be described. First, if the second transistor Q2 becomes on, a current $I_{L1}$ flows through the induction heating coil L1, the resonance capacitor C1, and the second transistor Q2. If and when the second transistor Q2 becomes off and the first transistor Q1 becomes on, a circulating current in the same direction flows through the induction heating coil L1, the resonance capacitor C1 and the diode D1. If and when the circulating current becomes zero, a current flowing into the series resonance circuit 2 is inverted and hence a current flows through the first transistor Q1, the resonance capacitor C1 and the induction heating coil L1. Subsequently, the second transistor Q2 becomes on and the first transistor Q1 becomes off; however, a circulating current flows through the diode D2, the resonance capacitor C1 and the induction heating coil L1 for a while. In such a way, the SEPP inverter continues to oscillate, the frequency being set to about 20 kHz.

The driving of the first heating unit 1 and the second heating unit 1' are made with the phase being inverted by 180°. More particularly, if and when the second transistor Q2 in the first heating unit 1 is in an on-state, the second transistor Q2' in the second heating unit 1' is in an off-state and vice versa. This is achieved by an adjustment of the winding directions of the windings n7, n8, n9 and n10. Accordingly, a current withdrawn from the filter capacitor C2 alternately flows into the second transistors Q2 and Q2' in the first and second heating units 1 and 1' and thus the current never flows into the second transistors Q2 and Q2'.

Figure 21:
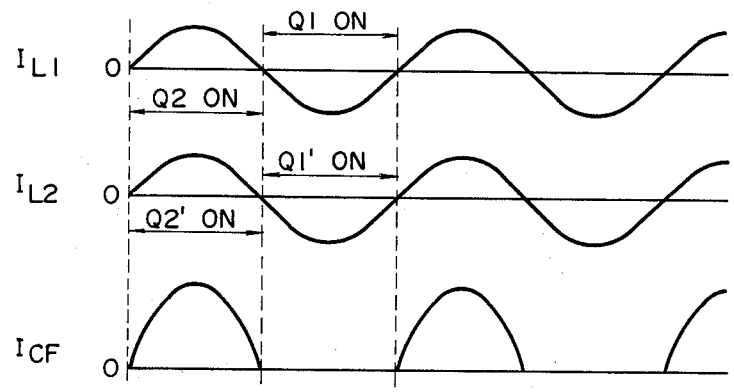
FIGS. 21 and 22 are waveform charts for explaining an effect of the FIG. 19 embodiment.
Figure 22:
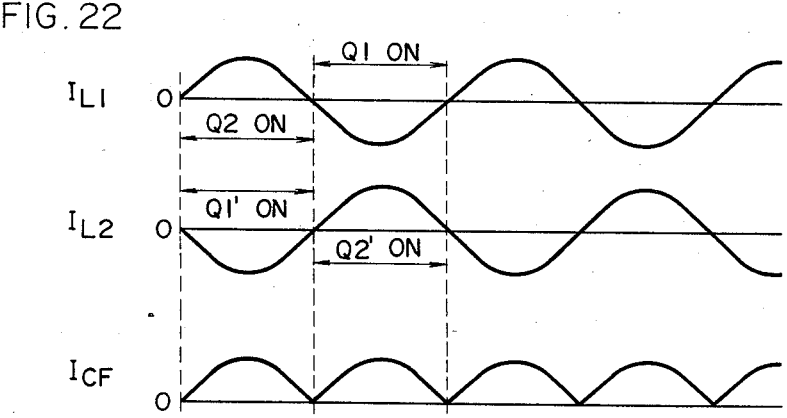

FIG. 21 shows a relation of load currents $I_{L1}$, $I_{L2}$ and flowing current $I_{CF}$ of the capacitor C2 of the conventional example where the operating cycles of the first and second heating units 1 and 1' are made the same, and of the present embodiment, respectively. In FIG. 21, since the second transistors Q2 and Q2' become on at the same time, the current $I_{CF}$ flowing thereinto becomes large by superimposing two currents of two units, whereas, in FIG. 22, since the second transistors Q2 and Q2' alternately become on, the current $I_{CF}$ is a current of only one unit and thus the value of the peak current becomes small. In such a way, a flowing current of the filter capacitor C2 is averaged. Although, in the present embodiment of a 2-unit type of cooking apparatus, the phase shift is set to 180°, the phase shift of an operating cycle in each of heating units may be 120° in case of a 3-unit type of cooking apparatus, for example.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An induction heating apparatus comprising:
    a direct current power source having a high electric potential terminal and a low electric potential terminal;
    a first switching element and a second switching element connected between the high electric potential terminal and the low electric potential terminal of said direct current power source and connected in series with each other;
    said first switching element being disposed on the side of the high electric potential terminal of said direct current power supply and said second switching element being disposed on the side of the low electric potential terminal;
    a load circuit connected in parallel with said first switching element and includes an induction heating coil and a resonance capacitor;
    a first controlling circuit for turning said first swtiching element on/off in a predetermined cycle;
    a second controlling circuit for turning said second switching element on during an arbitrary time period during an off interval of said first switching element;
    input adjusting means operatively coupled to said second controlling circuit for adjusting an on interval of said second switching element so that an input to said load circuit is adjusted, said input adjusting means including means acting on said signal generating means for varying said time width of said second driving signal; and
    an oscillating circuit for providing a control input to said first controlling circuit and said second controlling circuit wherein said first controlling circuit includes first signal generating means responsive to an output from said oscillating circuit for generating a first driving signal having a predetermined time width for driving said first switching element and said second controlling circuit includes second signal generating means responsive to an output from said oscillating circuit for generating a second driving signal for driving said second switching element.

2. An induction heating apparatus in accordance with claim 1 or 2, wherein
    said second controlling circuit includes a power supply circuit (DB3) receiving an output from said oscillating circuit (6) for driving said second signal generating means (MV,Q5–Q7).

3. An induction heating apparatus in accordance with claim 1 or 2, wherein
    said oscillating circuit is structured as a 2-transformer type of self-excited oscillating circuit including a transformer (T1),
    said transformer (T1) having a first output winding (n7) and a second output winding (n8) having an opposite polarity to said first output winding (n7), and
    said first signal generating means (71;R5,C4) is connected to said first output winding (n7) and said second signal generating means (72;MV,Q5–Q7) is connected to said second output winding (n8).

4. An induction heating apparatus comprising:
    a direct current power source having a high electric potential terminal and a low electric potential terminal;

a first switching element and a second switching element connected between the high electric potential terminal and the low electric potential terminal of said direct current power source and connected in series with each other, each of said first switching elements and said second switching elements being comprised of unidirectional switching elements and further including a first unidirectional element connected in antiparallel with said first switching element, and a second unidirectional element connected in antiparallel with said second switching element;

said first switching element being disposed on the side of a high electric potential terminal of said direct current power supply and said second switching element being disposed on the side of the low electric potential terminal;

a load circuit connected in parallel with said first switching elements and including an induction heating coil and a resonance capacitor;

a first controlling circuit for turning said first switching element on/off in a predetermined cycle; and a second controlling circuit for turning said second switching element on during an arbitrary time period during an off interval of said first switching elements, comprising first current detecting means for detecting a current flowing through said first and second unidirectional switching elements, second current detecting means for detecting a current flowing through said first and second unidirectional elements, and an input controlling circuit for controlling an on/off state of said second unidirectional switching element based on an output from said first current detecting means and an output from said second current detecting means.

5. An induction heating apparatus in accordance with claim 4, wherein said input controlling circuit includes first voltage converting means (10,C13,R13) for converting the output from said first current detecting means (CT1) into a voltage, second voltage converting means (11,C14,R14) for converting the output from said second current detecting means (CT2) into a voltage, and means for driving said second switching element (Q2) depending on a difference (Vout;V1−V2) between an output voltage (V1) from said first voltage converting means (10,C13,R13) and an output voltage (V2) from said second voltage converting means (11,C14,R14).

6. An induction heating apparatus in accordance with claim 5, wherein said input controlling circuit includes a reference voltage circuit (R16,R17) for generating a reference voltage (Vref), comparing means (12) for comparing said difference voltage (Vout) with said reference voltage (Vref), and a driving circuit (13) responsive to an output from said comparing means (12) for driving said second switching element (Q2).

7. An induction heating apparatus in accordance with claim 5 or 6, wherein said input controlling circuit includes modifying means (ZD1,R15) for modifying one of said difference voltage (Vout) and said reference voltage (Vref) in response to a fluctuation of a power supply voltage.

8. An induction heating apparatus in accordance with claim 7, wherein said modifying means includes a circuit (C15, C16) for withdrawing a voltage (Vcc) corresponding to a fluctuation of an output from said direct current power supply (DB1), a series circuit of a voltage regulator element (ZD1) receiving said voltage (Vcc) and a resistor element (R15), and means for synthesizing a terminal voltage (Vs) of said resistor element (R15) and said difference voltage (Vout).

9. An induction heating apparatus in accordance with claim 6, wherein said reference voltage circuit includes means (R17) for adjusting said reference voltage (Vref).

10. An induction heating apparatus comprising:

a direct current power source (DB1) having a high electric potential terminal and a low electric potential terminal, a series connection of a first switching element (Q1) and a second switching element (Q2) connected between the high electric potential terminal and the low electric potential terminal of said direct current power source (DB1), said first switching element (Q1) being disposed on the side of the high electric potential terminal of said direct current power source (DB1) and said second switching element (Q2) being disposed on the side of the low electric potential terminal so that a single ended push-pull inverter is structured, an inductance element (L2) provided in a current path of said single ended push-pull inverter for absorbing a surge current caused in the single ended push-pull inverter, a load circuit connected in parallel with said first switching element (Q1) and including an induction heating coil (L1) and a resonance capacitor (C1), a first controlling circuit (71) for turning said first switching element (Q1) on/off in a predetermined cycle, and a second controlling circuit(72:8) for turning said second switching element (Q2) on during an arbitrary time period during the off interval of said first switching element (Q1).

11. An induction heating apparatus in accordance with claim 10, wherein said inductance element (L2) is disposed in a current path of said first switching element (Q1) or a current path of said second switching element.

12. An induction heating apparatus in accordance with claim 10, wherein said first switching element (Q1) comprises a unidirectional switching element, and which further comprises a unidirectional element (D1) connected in anti-parallel with said first switching element (Q1), said inductance elements (L2) being disposed in a current path of said unidirectional element (D1).

13. An induction heating apparatus in accordance with any one of claims 10 to 12, wherein said inductance element is a toroidal core (L2) in a doughnut shape and said current path is inserted through the toroidal core (L2).

14. An induction heating apparatus comprising:

a direct current power source (DB1) having a high electric potential terminal and a low electric potential terminal, a plurality of series circuits connected between the high electric potential terminal and the low electric potential terminal of said direct current source (DB1) and each including a series connection of a first switching element (Q1) and a second switching element (Q2), each of said first switching elements (Q1) being disposed on the side of the high electric potential end of said direct current power source (DB1), and each of said second switching elements (Q2) being disposed on the side of the low electric potential terminal of said direct current power source, a plurality of load circuits connected in parallel with each of said first switching elements (Q1) and each including an induction heating coil (L1) and a resonance capacitor (C1), one or more first controlling circuit (71) for turning said plurality of said first switching elements (Q1) on/off in a predetermined cycle, and a plurality of second controlling circuits (72:8) for turning a corresponding second switching elements (Q2) on during an arbitrary time period during an off interval of said first switching elements (Q1).

15. An induction heating apparatus in accordance with claim 14, which further comprises
a plurality of input adjusting means (VR:R17) operatively coupled to each of said second controlling circuits (72:8) for adjusting an on interval of the corresponding second switching element (Q2) so that an input to the corresponding load circuit is adjusted.

16. An induction heating apparatus in accordance with claims 14 or 15, wherein
a plurality of said first controlling circuits are provided, which further comprises
means (T1;n7–n10) for making different from each other the on intervals of a plurality of said first switching elements (Q1) controlled by said plurality of first controlling circuits (71).

17. An induction heating apparatus in accordance with claim 16, wherein
said plurality of first controlling circuits include a circuit (71;R5,C4) responsive to a respectively applied control input for driving a corresponding first switching element (Q1), respectively, and which further comprises
an oscillating circuit (6) for applying to the respective circuits (71;R5,C4) said control inputs which are different in phase from each other.

18. An induction heating apparatus in accordance with claim 17, wherein
said oscillating circuit is structured as a 2-transformer type of self-oscillating circuit including a transformer (T1),
said transformer (T1) having a plurality of output windings (n7,n9) each coupled to the corresponding said circuit (71;R5,C4),
said plurality of output windings being wound in an opposite polarity with respect to each other.

19. An induction heating apparatus in accordance with claim 18, wherein
each of said second controlling circuits includes a circuit (72;MV,Q5–Q7) responsive to an applied control input for driving a corresponding second switching element (Q2), and said transformer (T1) comprises a plurality of second output windings (n8,n10) each coupled to its corresponding circuit (72;MV,Q5–Q7),
said plurality of second output windings being wound in an opposite polarity with respect to each other.

20. An induction heating apparatus in accordance with claim 14, wherein
each of said first switching elements (Q1) comprises a PNP transistor and each of said second switching elements (Q2) comprises an NPN transistor, whereby said PNP transistor and NPN transistor form a complementary SEPP circuit, said one or more first controlling circuits comprise a single first controlling circuit (71) commonly used for said plurality of first switching element (Q1), which further comprises
a common oscillating circuit (6) for providing a control input to each of said single first controlling circuit (71) and said plurality of second controlling circuits (72).

21. An induction heating apparatus in accordance with claim 20, wherein
each of said PNP transistors includes a PNP transistor and an NPN transistor connected to each other in Darlington fashion.

22. An induction heating apparatus in accordance with claim 20, wherein
said common oscillating circuit (6) includes a transformer (T1) having two output windings (n7, n8), one output winding (n7) being connected to said single first controlling circuit (71) and the other output winding (n8) being connected to each of said plurality of second controlling circuit (72).

23. An induction heating apparatus comprising:
a direct current power source (DB1) having a high electric potential end and a low electric potential end,
a series connection of a first switching element (Q1) and a second switching element (Q2), connected between the high electric potential terminal and the low electric potential terminal of said direct current power source (DB1),
said first switching element (Q1) being disposed on the side of the high electric potential terminal of said direct current power source (DB1) and said second switching element (Q2) being disposed on the side of the low electric potential terminal,
a load circuit connected in parallel with said first switching element (Q1) and including an induction heating coil (L1) and a resonance capacitor (C1),
a first controlling circuit (71) for turning said first switching element (Q1) on/off in a predetermined cycle,
a second controlling circuit (72:8) for turning said second switching element (Q2) on during an arbitrary time period during an off interval of said first switching element (Q1), and
soft start means (R6,C9,Q8:C17:R26,C29,Q28) associated with said second controlling circuit (72:8) for making the on interval of said second switching element (Q2) shorter than that in a stationary state so that a soft start is achieved.

24. An induction heating apparatus in accordance with claim 23, wherein
said second controlling circuit includes a signal generating circuit (MV,Q5–Q7:12,13) responsive to a control input for generating a driving signal for driving said second switching element (Q2), and said soft start means includes means for varying a time width of said driving signal.

25. An induction heating apparatus in accordance with claim 24, wherein
said signal generating circuit includes a pulse generator (MV) being triggered in response to a control input, and
said soft start means includes
an impedance element (VR) for determining a time width of the pulses from said pulse generator (MV), and
impedance varying means (R6,C9,Q8) for varying an impedance of said impedance element (VR) according to a time passed from the time of turning on of said direct current power source (DB1).

26. An induction heating apparatus in accordance with claim 24, wherein
said signal generating circuit includes comparing means (12) for comparing a control input (Vout) and a reference input (Vref), and
said soft start means includes input varying means (C17:R26,C29,Q28) for varying one of said control input (Vout) and said reference input (Vref) according to a time passed from the time of turning on of said direct current power source (DB1).

27. An induction heating apparatus in accordance with claim 26, wherein
said signal generating circuit includes a voltage divider circuit for generating a reference input (Vref) and comprised of a plurality of impedance elements (R16,R17) coupled to an output from said direct current power source (DB1), and
said soft start means includes a capacitor (C17) connected in parallel with at least one of said plurality of impedance elements (R16,R17).

28. An induction heating apparatus in accordance with claim 26, wherein
said soft start means includes
a capacitor (C29) connected to an output from said direct current power source (DB1), the terminal voltage thereof being synthesized with said control input (Vout), and
means (R26,Q28) for varying a charge current for said capacitor (C29) in response to an output voltage from said direct current power source (DB1).

* * * * *